Feb. 6, 1940.   I. OSTROMISLENSKY   2,189,293
NONSHATTERING GLASS
Filed Jan. 3, 1928
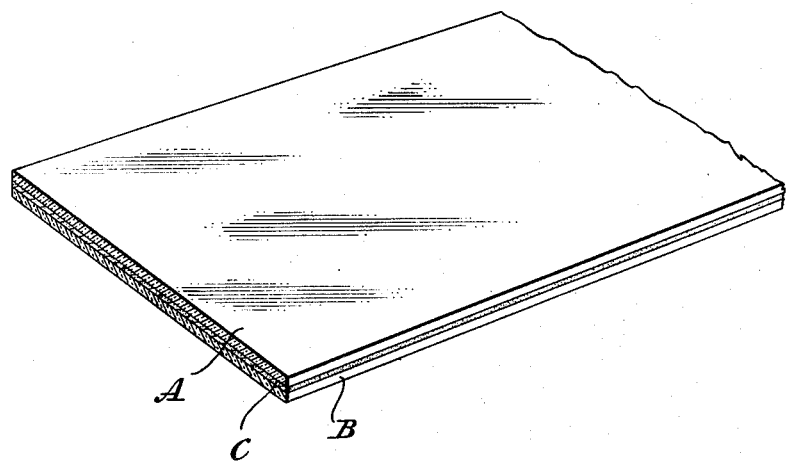
INVENTOR
IWAN OSTROMISLENSKY
BY Walter L. Piper
ATTORNEY Patented Feb. 6, 1940

2,189,293

UNITED STATES PATENT OFFICE 2,189,293

NONSHATTERING GLASS

Iwan Ostromislensky, New York, N. Y., assignor, by mesne assignments, to Carbide and Carbon Chemicals Corporation, New York, N. Y., a corporation of New York Application January 3, 1928, Serial No. 244,258

9 Claims. (Cl. 49—81)

This invention is concerned with nonshattering glass and methods of making the same, and more particularly it relates to improved laminated glass more strongly resistant to breaking and shattering.

Ordinary glass sheets are relatively fragile, and when subjected to breaking stresses, tend to disintegrate into flying fragments, which may cause serious injury to persons or objects near the breaking glass. It is an object of the invention substantially to avoid such dangers, by providing a laminated glass of greater strength and resistance to shock and shattering, and one of improved, and substantially permanent, transparency.

Alpha-polystyrol, its homologues and analogues, which are described in many of my prior patents and applications, as for instance, Patents No. 1,552,874, September 8, 1925; No. 1,552,875, September 8, 1925 and No. 1,613,673, January 11, 1927, are vitreous, colorless and plastic masses, of a transparency equal to the highest grades of mineral glass. These resins are very tough, exceptionally resistant to breakage, and they display a conchoidal fracture when broken.

There are two modifications of alpha-polystyrol and its analogues, one of which, for convenience, may be designated as normal, and the other abnormal. The normal modification is soluble in a number of organic solvents, such as benzol, distyrol, carbon disulphide, carbon tetrachloride, ether, and the like. The abnormal variety cannot be dissolved in any substance, but it swells easily in any solvent for the normal modification. Other types of polystyrol or its analogues may be designated as the beta, gamma and delta varieties, which in dry form as initially obtained may be readily pulverized to a fine powder. These types of polystyrol also occur in both soluble and insoluble modifications.

I have discovered that when a thin coating of one of the soluble variety of polystyrol is carefully confined under certain conditions between two sheets of plate glass, the sheets will be glued together very effectively, forming an altogether transparent, colorless pane of composite glass, which is exceedingly resistant to shattering. To the eye of the observer, this double pane of glass is optically homogeneous, and due to the higher refractive index of polystyrol, or its analogues, the composite pane may appear even clearer and more transparent than either of the mineral glass sheets alone. Neither does the condition of the glass so produced change under prolonged exposure to ultra-violet energy, as derived, for instance, from sunlight. Exposures over a period of five years have demonstrated that there is no darkening of the glass, and that it remains completely colorless and entirely transparent for at least this length of time The accompanying drawing illustrates an embodiment of the invention, and shows a section of the improved composite glass.

Any variety of polystyrol may be used, including the soluble or insoluble modifications of the alpha, beta, gamma or delta types. The insoluble form of the resins, which swells rather than dissolves in different liquids, will provide satisfactory glass binding action, although its adhesive qualities are not as good as those of the soluble variety. The preferred procedure consists in covering one of the sheets of mineral glass with a coating, either of a relatively weak solution of polystyrol glass, or with a mixture of polystyrol glass and a small amount of liquid in which the particular styrol dissolves or swells. A more homogeneous laminated glass from an optical standpoint is thus obtained, and the use of solvents prevents the formation of bubbles or rough spots in the polystyrol layer between the two sheets. Benzol, toluol, ethyl-benzol, distyrol, chlor-benzol, and the like, may be used as solvents in this procedure. The solvent must have sufficient stability to resist decomposition, and it must remain colorless, and not darken under prolonged exposure to sunlight. For this reason many unsaturated nonbenzoic compounds, and especially aldehydes, ketones, and many alkyl-chlorides and iodides, are not suitable for the purpose.

In certain cases, when it is desired to obtain thick but fairly optically homogeneous glass, such as one composed of three sheets, it may be necessary hermetically to seal the outer edges of the superposed sheets, or rather that part of the surface where the intermediate layer of polystyrol glass is uncovered, and without protection from the surrounding medium. This procedure is of especial advantage in cases where the solvent used is liable to evaporate relatively quickly. In the usual procedure, clamping the outer edges of the superposed sheets is sufficient.

If an insufficient amount of the solvent has been used, or if it has evaporated almost entirely from the intermediate layer, the glass is liable to turn cloudy, or to display whitish spots. When this occurs, the cloudiness or spots may be caused to disappear rapidly by heating the article to a temperature of from 60° to 120° C. for a short time. Or the superposed sheets may be separated, and a certain amount of fresh solvent added to the polystyrol coating, after which the sheets are again superposed and pressed together.

The following examples are illustrative of the invention and certain of its embodiments:

Example 1

On a sheet of glass, 30.5 cm. square and 0.2 cm. thick, a benzol solution of normal alpha-polystyrol is poured continuously and carefully, and as evenly as possible, so as to cover the whole of the surface. The excess benzol is evaporated by leaving the sheet open to the air from 2 to 12 hours. Thereupon the polystyrol layer is carefully covered with the second sheet of glass of the same size. The sheets are then pressed together, preferably over the whole surface, under a pressure of ⅛ of an atmosphere.

Example 2

The surface of a sheet of mineral glass, as described in Example 1, is covered with a coating of chemically pure styrol ($C_6H_5CH:CH_2$). Styrol which has partially polymerized to polystyrol may be used. Thereupon the second sheet of glass is laid upon it under certain pressure. The resulting article is then kept at room temperature or else heated to 60°–100°–170° C., depending upon the stability of the mineral glass used in each instance, until the glass becomes optically homogeneous and very durable.

The improved glass as shown in the drawing, forming a part hereof, consists of two sheets A and B of glass, and an interposed layer C of polystyrol. Glass prepared in this manner, is nonshattering, substantially as transparent as before treatment, and does not discolor with age, nor lose its transparency. This is due to the particular laminating material used, namely, alpha-polystyrol.

What is claimed as new is:

1. As a new article of manufacture a plurality of sheets of mineral glass adhesively joined by polystyrol.

2. As a new article of manufacture, superposed sheets of mineral glass, adhesively joined by an interposed relatively thin layer of polystyrol ($C_6H_5CH:CH_2$).

3. The process of making nonshatterable glass, which consists in joining a plurality of sheets of mineral glass with a layer of polystyrol between the adjacent faces of the sheets.

4. The process of making nonshatterable glass, which consists in joining a plurality of sheets of mineral glass with a layer of polystyrol containing a substance capable of dissolving or swelling the polystyrol.

5. As a new article of manufacture, a nonshattering glass, composed of alternate sheets of mineral glass and layers of polystyrol adhesively connecting the sheets, the outer edges of the sheets being sealed.

6. The process of making nonshattering glass which consists in covering a sheet of mineral glass with a layer of polystyrol and superposing upon the layer with pressure another sheet of mineral glass.

7. Method of uniting articles comprising applying a layer of material containing a vinyl compound between the surfaces thereof, subjecting the same to pressure and polymerizing said vinyl compound in situ.

8. Method of uniting articles comprising applying a layer of a material containing a partially polymerized vinyl compound between the surfaces thereof, subjecting the same to pressure and further polymerizing said vinyl compound in situ.

9. Method of uniting articles of glass comprising applying a layer of a material containing a vinyl compound between the surfaces thereof, subjecting the same to pressure and polymerizing said vinyl compound in situ.

IWAN OSTROMISLENSKY.